(12) United States Patent
Seel et al.

(10) Patent No.: US 11,458,883 B2
(45) Date of Patent: Oct. 4, 2022

(54) ADJUSTMENT DEVICE FOR A MOTOR VEHICLE HEADLIGHT

(71) Applicant: ZKW Group GmbH, Wieselburg (AT)

(72) Inventors: Reinhard Seel, Ober-Grafendorf (AT); Günter Bauer, Blindenmarkt (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 17/414,525

(22) PCT Filed: Nov. 26, 2019

(86) PCT No.: PCT/EP2019/082582
§ 371 (c)(1),
(2) Date: Jun. 16, 2021

(87) PCT Pub. No.: WO2020/126349
PCT Pub. Date: Jun. 25, 2020

(65) Prior Publication Data
US 2022/0048427 A1    Feb. 17, 2022

(30) Foreign Application Priority Data
Dec. 18, 2018    (EP) .................................... 18213382

(51) Int. Cl.
*B60Q 1/00*   (2006.01)
*B60Q 1/068*  (2006.01)
*B60Q 1/076*  (2006.01)

(52) U.S. Cl.
CPC .......... *B60Q 1/0683* (2013.01); *B60Q 1/076* (2013.01)

(58) Field of Classification Search
CPC .... B60Q 1/068; B60Q 1/0683; B60Q 1/0686; B60Q 1/076
See application file for complete search history.

(56) References Cited

FOREIGN PATENT DOCUMENTS

DE          10332976 A1    4/2005
DE     102005038829 A1   12/2007
(Continued)

OTHER PUBLICATIONS

International Search Report for PCT/EP2019/082582, dated Jan. 28, 2020 (14 pages).
(Continued)

*Primary Examiner* — Robert J May
(74) *Attorney, Agent, or Firm* — Eversheds Sutherland (US) LLP

(57) ABSTRACT

Adjusting device for adjusting an optically relevant assembly of a motor vehicle headlight. The device includes: a drive device with a first actuator adjustable along a displacement axis and having a first engaging portion, a transfer element mechanically engaged with the first actuator, and which has a first counter engaging portion corresponding to the first engaging portion, a supporting bushing in which the transfer element is supported and rotatable about the displacement axis, wherein the supporting bushing is firmly connected to a carrying frame, wherein the assembly is arranged on the carrying frame, and a second actuator rotatable about the displacement axis and having a second engaging portion, wherein the transfer element has a second counter engaging portion arranged opposite to the first counter engaging portion on the displacement axis, and wherein the second counter engaging portion is mechanically engaged with the second engaging portion.

13 Claims, 3 Drawing Sheets

(56) References Cited

FOREIGN PATENT DOCUMENTS

Figure 3:
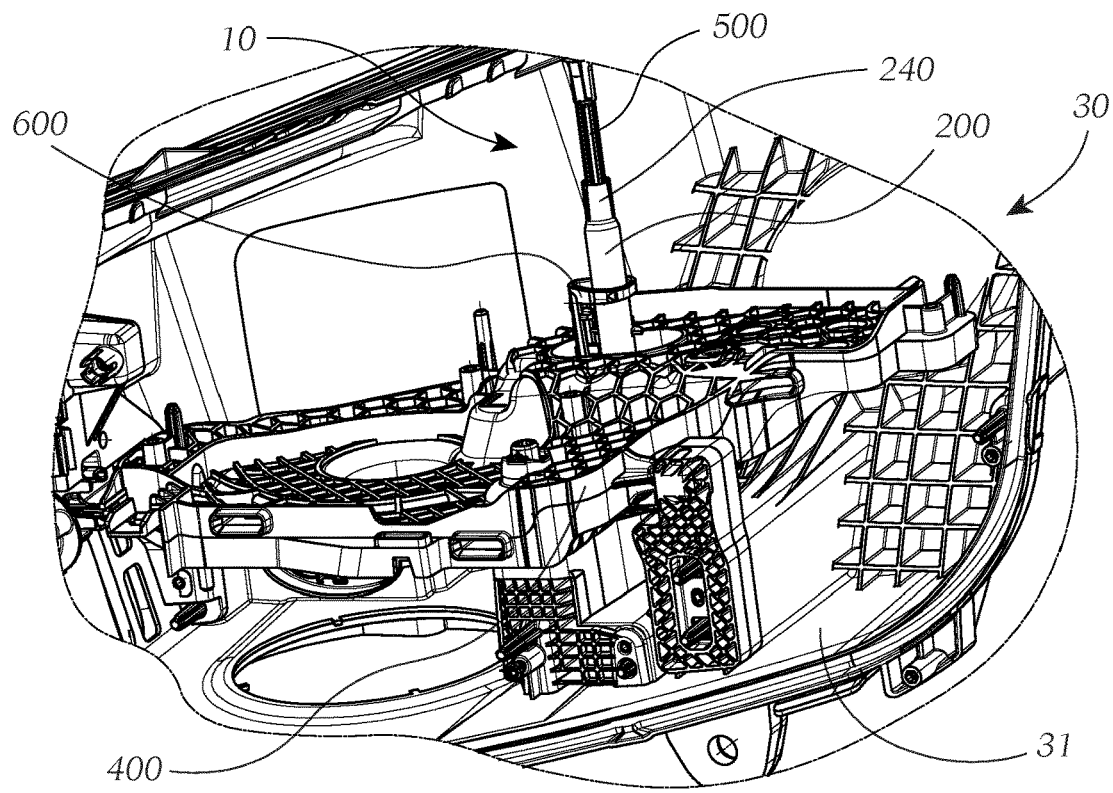

| | | |
|---|---|---|
| DE | 102014200237 A1 | 9/2015 |
| EP | 0588715 A1 | 3/1994 |
| EP | 2112021 B1 | 10/2009 |
| EP | 2394850 B1 | 12/2009 |
| EP | 2213513 B1 | 4/2010 |
| EP | 2918447 B1 | 9/2015 |
| WO | WO-2021239370 A1 * | 12/2021 |

OTHER PUBLICATIONS

Search Report for European Patent Application No. 18213382.7 dated Feb. 28, 2019 (9 pages).

* cited by examiner

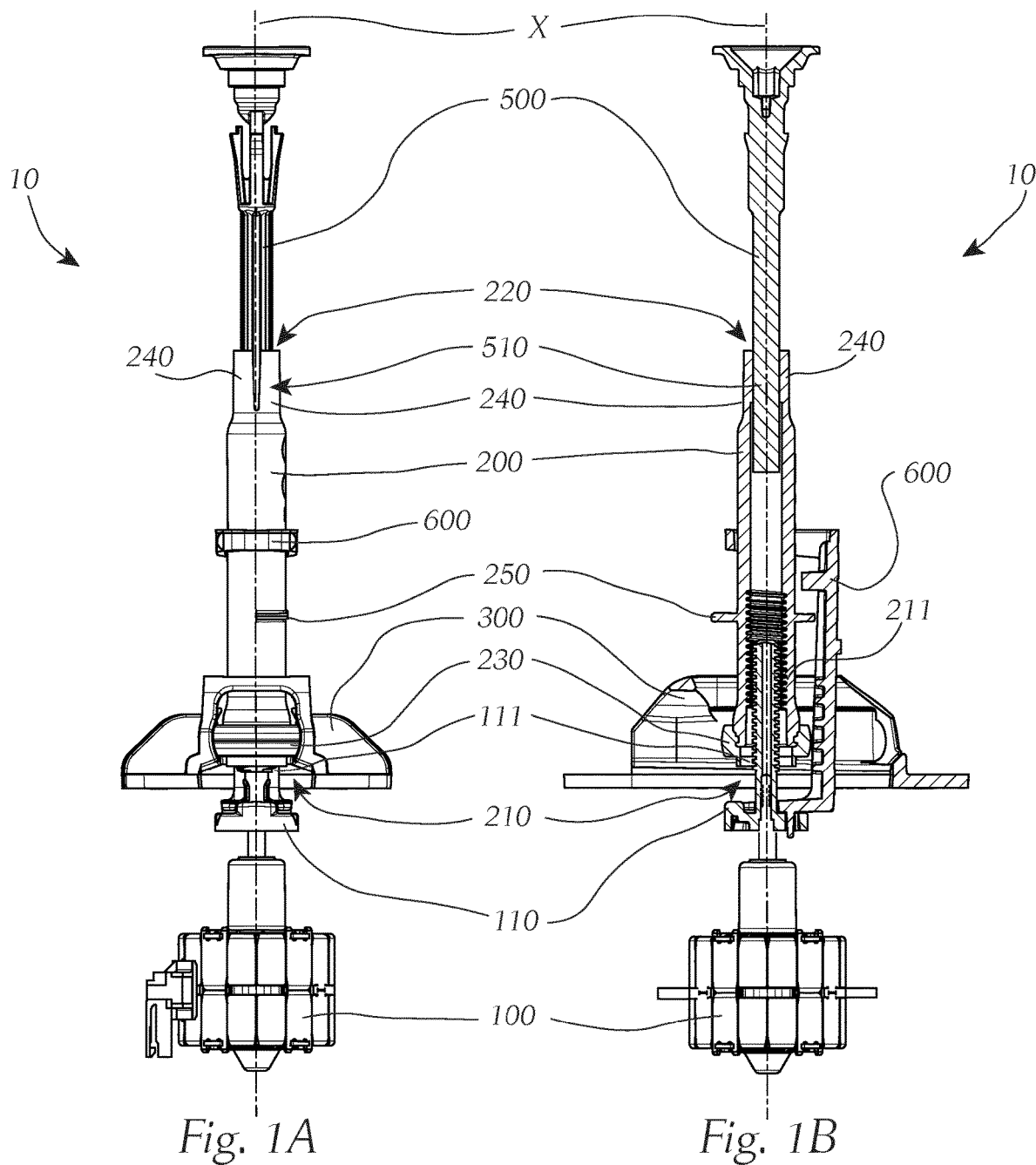
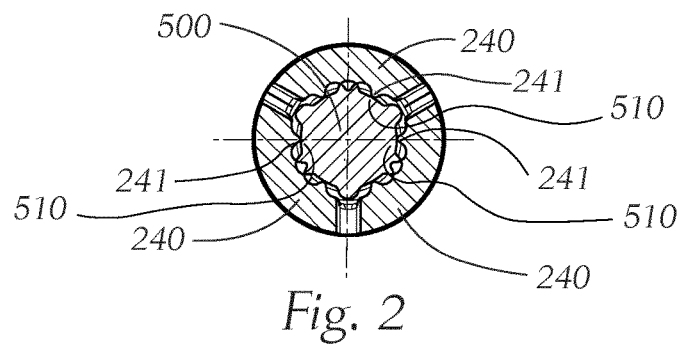

ADJUSTMENT DEVICE FOR A MOTOR VEHICLE HEADLIGHT

The invention relates to an adjusting device for adjusting at least one optically relevant assembly of a motor vehicle headlight.

Furthermore, the invention relates to a motor vehicle headlight having a housing and at least one adjusting device according to the invention.

To adjust the light pattern generated with a motor vehicle headlight in a legally compliant manner, it is necessary that one or multiple optically relevant assemblies of the headlight are adjustable in the vertical direction and/or laterally, as well as in other ways. Such an optically relevant assembly can be, for example, a light module, such as one consisting of at least one light source, at least one reflector, at least one lens, etc.; however, it can also be an individual component such as a reflector, a lens, etc., which is adjusted accordingly.

In this case, the at least one optically relevant assembly is often supported in the headlight in such a manner that the assembly can be pivoted about one or multiple axes, for example, about a horizontal and/or a vertical axis. For example, one or multiple light modules are supported on a carrying frame, and the carrying frame is supported in such a manner that it can swivel about one or two axes, as described above.

Adjusting devices for adjusting optically relevant assemblies of motor vehicle headlights, such as light sources, reflectors and/or lenses, make it possible to adapt the light pattern generated by the headlight to predefined requirements. This makes it possible to subsequently use an adjusting device to even out deviations from target specifications, which, for example, are detected after an installation process of the headlight in a motor vehicle.

A typical task of adjusting devices is adjusting the light range of a headlight, wherein this technical field in particular is often referred to as "headlight range control"—or "HRC" for short.

At least one drive device is usually provided for said adjustment, wherein the drive device is usually manually actuable. For example, the drive device may comprise a rotary wheel or an adjustment screw, the rotational movement of which is converted into a linear movement of a sliding element via a suitable mechanism, which sliding element is guided in corresponding sliding paths in the headlight housing in a displaceable manner. An adjustment point of the optically relevant assembly, e.g. of the carrying frame to which the assembly is attached, is supported in the sliding element, such that the assembly or the carrying frame are pivoted when the sliding element is displaced.

A problem underlying the invention is to provide an improved adjusting device for adjusting at least one optically relevant assembly.

This problem is solved by the fact that the adjusting device comprises the following:

- a drive device with a first actuator which is linearly adjustable along a displacement axis, is arranged such that it is unable to rotate, and has a first engaging portion,
- a transfer element which is mechanically engaged with the first actuator, wherein the transfer element has a first counter engaging portion corresponding to the first engaging portion of the first actuator,
- a supporting bushing in which the transfer element is supported by means of a supporting portion of the transfer element such that it can rotate about the displacement axis, wherein the supporting bushing is firmly connected to a carrying frame, wherein the at least one optically relevant assembly is arranged on the carrying frame, and
- a second actuator which is supported such that it is rotatable about the displacement axis and which has a second engaging portion, wherein the transfer element has a second counter engaging portion, which second counter engaging portion is arranged opposite to the first counter engaging portion of the transfer element on the displacement axis, and wherein the second counter engaging portion is mechanically engaged with the second engaging portion, and wherein the second actuator, in combination with the first engaging portion of the first actuator, is set up to convert a rotational movement of the second actuator into a stroke movement of the transfer element along the displacement axis.

The supporting bushing engages with the carrying frame, or indirectly with at least one optically relevant assembly, in such a manner that a movement of the first as well as the second actuator can be converted into a changed orientation of the optically relevant assembly. The optically relevant assembly can be, for example, shutters (or shutter arrangements), light sources, reflectors, lenses, entire light modules, or assemblies, etc.

Furthermore, the fine adjustment of the movement of the transfer element along the displacement axis via the second actuator is determined by the thread pitch of the thread of the first actuator and the corresponding counter thread of the transfer element.

The supporting portion can be integrally formed or integrally connected with the transfer element, wherein the transfer element preferably is integrally formed or integrally connected with the counter thread and the supporting portion and/or other elements of the transfer element.

The second actuator may be designed as an actuating rod. Therein, the longitudinal axis of the actuating rod extends along the displacement axis.

The first engaging portion of the first actuator can be designed as a thread and the first counter engaging portion of the transfer element can be designed as a first opening with a counter thread corresponding to the thread, wherein the transfer element is at least partially screwed onto the first actuator by means of the counter thread.

Furthermore, the second counter engaging portion of the transfer element can be designed as a second opening, wherein the second actuator is supported displaceably along the displacement axis in the second opening of the transfer element.

It is also possible to design the first counter engaging portion of the transfer element as a thread and to design the first engaging portion of the first actuator as a first opening with a counter thread corresponding to the thread, wherein the first actuator is at least partially screwed onto or to the transfer element by means of the counter thread.

Furthermore, the second engaging portion of the second actuator can be designed as a second opening, wherein the second counter engaging portion of the transfer element is supported displaceably along the displacement axis in the second opening of the second actuator.

A rotational movement of the second actuator, which is preferably arranged non-displaceably with respect to the transfer element or the carrying frame, for example on a housing of a motor vehicle headlight, leads to a rotational movement of the transfer element due to the mechanically engaged second engaging portions or second counter engaging portions, wherein the rotational movement of the second actuator, which is transferred to the transfer element, generates a stroke movement of the transfer element, specifically in the sense that the transfer element is further screwed on and/or unscrewed due to the counter thread screwed onto the thread of the first actuator. Herein, the first actuator is arranged such that it cannot rotate relative to the transfer element.

It is advantageous if the second actuator is at least partially accommodated in the essentially circular second opening of the transfer element, which opening is arranged concentrically to the displacement axis, wherein the transfer element has elastic tabs to protect against overtightening, which tabs are arranged on the circumference of the second opening and extend along the displacement axis, wherein the elastic tabs have protrusions which are set up to engage with corresponding recesses arranged on the second actuator.

Herein, the protrusions may be designed in the form of axis-parallel cones and the corresponding recesses may be designed as axis-parallel grooves.

Advantageously, the drive device may be designed as a linear actuating motor.

Furthermore, the drive device may be arranged non-displaceably relative to the carrying frame.

The adjusting device may comprise a blocking element which is arranged in combination with a stop arranged on the outside of the transfer element, such that a rotational movement of the transfer element about the displacement axis is limited.

The maximum and the minimum stroke of the transfer element during an adjustment or a rotational movement of the second actuator along the displacement axis is limited by the blocking element and the corresponding stop arranged on the transfer element.

The supporting portion of the transfer element may be formed as a symmetrical spherical layer, wherein the supporting bushing has an opening corresponding to the symmetrical spherical layer.

A spherical layer, also called a cylindrical disc, is a part of a solid sphere that is sectioned out by two parallel planes. The curved surface part is also called spherical zone.

In a useful exemplary embodiment, the carrying frame may be arranged horizontally.

Furthermore, the displacement axis can be arranged vertically, preferably such that it is essentially perpendicular to the carrying frame.

As a result, the carrying frame, due to its own weight, rests on the supporting bushing or on the adjusting device in such a manner that no play is present in the system or such that the respective "actuators" of the adjusting device are preloaded. As a result, tolerance accumulations within the system can be decreased or reduced such that the adjusting device is more accurate overall or that the at least one optically relevant assembly can be adjusted with greater precision.

Accordingly, the use of sliding elements, which are difficult to adjust, is not necessary, which makes a motor vehicle headlight housing much easier to design and produce.

The problem is also solved by a motor vehicle headlight having a housing and at least one optically relevant assembly and having at least one adjusting device according to the invention.

Herein, the drive device may be firmly connected to the housing of the motor vehicle headlight.

Figure 4:
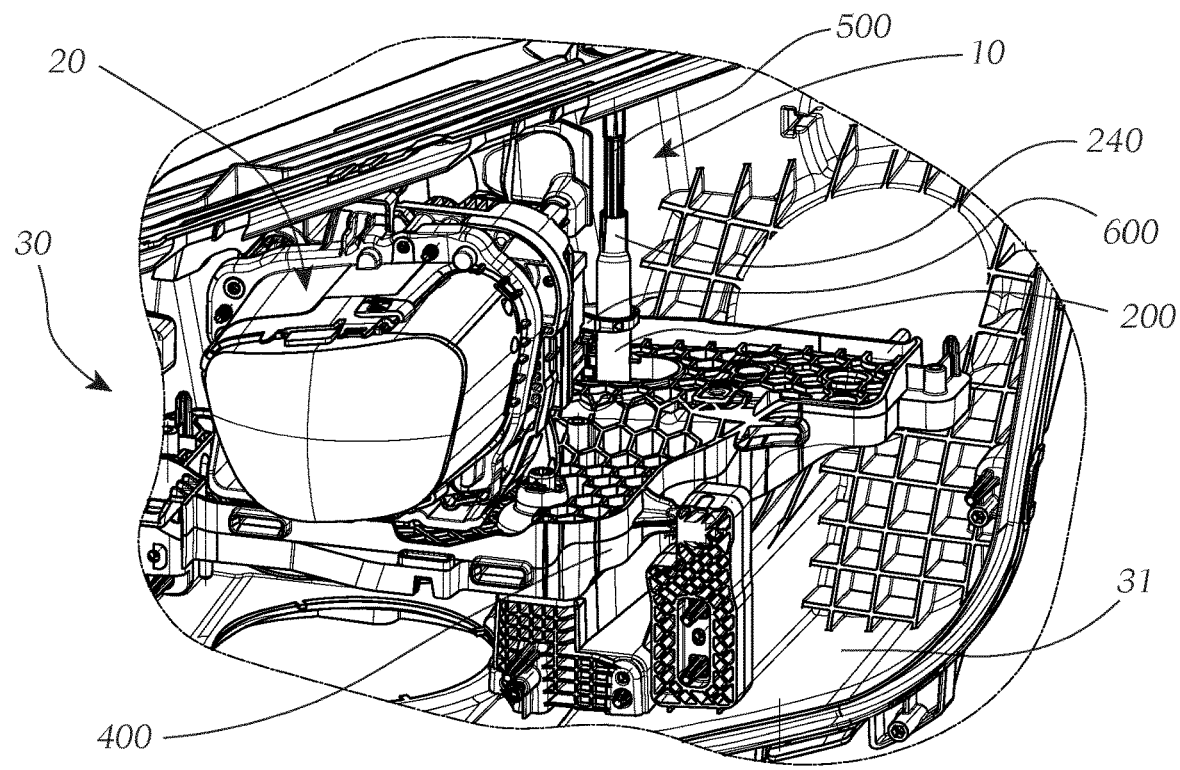
Figure 5:
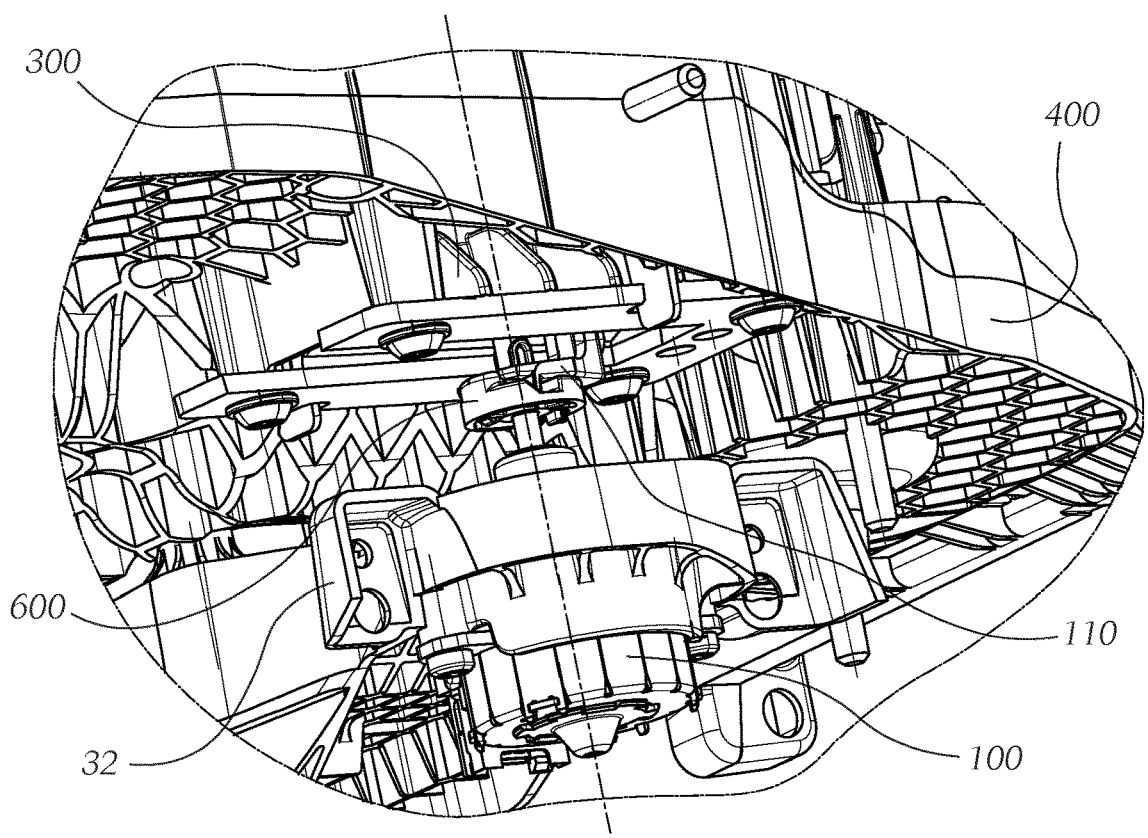
Figure 6:
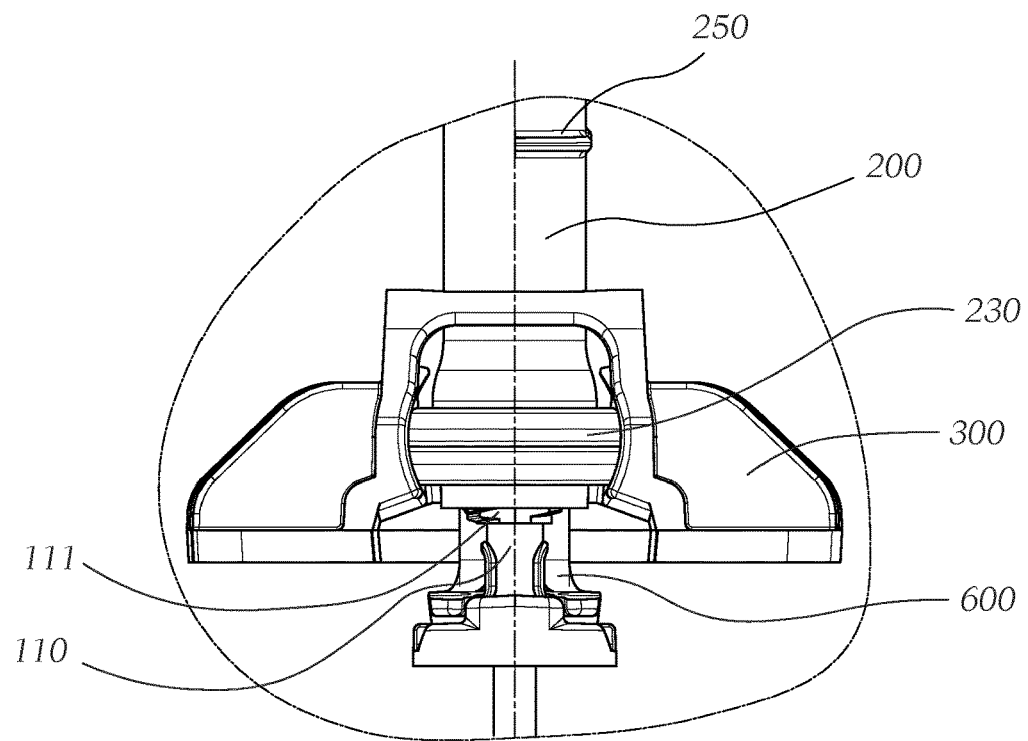

In the following, the invention is explained in more detail on the basis of exemplary drawings. In the drawings:

FIG. 1A shows an exemplary adjusting device with a drive means having a first actuator, a transfer element with elastic tabs, a supporting bushing in which the transfer element is supported and a second actuator, FIG. 1B is a cross-sectional view of the adjusting device from FIG. 1A, FIG. 2 is a cross-sectional view through the second actuator and the elastic tabs of the adjusting device from FIG. 1A, FIG. 3 shows an exemplary motor vehicle headlight having a housing, an exemplary adjusting device and a horizontally arranged carrying frame, which is connected to the adjusting device, FIG. 4 shows the motor vehicle headlight from FIG. 3, wherein an optically relevant assembly is arranged on the carrying frame, FIG. 5 is a detailed view of the adjusting device from FIG. 1A, which is connected to the carrying frame by means of the supporting bushing, and FIG. 6 is a detailed view of the transfer element arranged in the supporting bushing, wherein the transfer element is arranged in the supporting bushing by means of a supporting portion.

In principle, however, the optically relevant assembly may be an individual component of a motor vehicle headlight or of a lighting unit, such as a reflector, a lens, a light source, a shutter arrangement, etc., or the optically relevant assembly comprises one or multiple such components or one or multiple lighting units on a common carrier which can be pivoted.

For the sake of simplicity, the optically relevant assembly is assumed to be a light module in the following.

FIG. 1A shows an exemplary adjusting device 10 for adjusting at least one optically relevant assembly of a motor vehicle headlight, which adjusting device 10 comprises a drive device 100 which may be designed as a linear actuating motor, with a first actuator 110 that is linearly adjustable along a displacement axis X, which first actuator 110 is arranged such that it cannot rotate and has a first engaging portion. Herein, the first engaging portion is designed as the thread 111.

Furthermore, the adjusting device 10 comprises a transfer element 200 which is mechanically engaged with the first actuator 110, wherein the transfer element 200 has a first counter engaging portion corresponding to the thread 111 of the first actuator 110, which first counter engaging portion is designed as the first opening 210 with a counter thread 211 corresponding to the thread 111.

FIG. 1B shows a cross-sectional view of the adjusting device 10, wherein the thread 111 and the counter thread 211, which engage with each other, are easier to recognize, illustrating that the transfer element 200 is at least partially screwed onto the first actuator 110 by means of the counter thread 211, i.e., that it can still be screwed on further or unscrewed.

The adjusting device 10 also includes a supporting bushing 300, in which the transfer element 200 is supported by means of a supporting portion 230 of the transfer element 200 such that it is rotatable about the displacement axis X, wherein the supporting portion 230 is designed integrally in the example shown here, for example, produced by means of an injection moulding process.

Furthermore, a second actuator 500 is shown in FIGS. 1A and 1B, which is supported rotatably about the displacement axis X and which has a second engaging portion 510, wherein the transfer element 200 has a second counter engaging portion 220, which second counter engaging portion 220 is arranged opposite to the first opening 210 of the transfer element 200 on the displacement axis X. Herein, the second counter engaging portion of the transfer element 200 is designed as a second opening 220, wherein the second actuator 500 is supported displaceably along the displacement axis X in the second opening 220 of the transfer element 200.

The second actuator 500 is at least partially accommodated in the second opening 220 of the transmission element 200, which is essentially circular, and which is arranged concentrically to the displacement axis X, as can be seen particularly in FIG. 1B, wherein the transfer element 200 has elastic tabs 240 to protect against overtightening, which are arranged at the circumference of the second opening 220 and extend along the displacement axis X.

FIG. 2 is a cross-sectional view through the elastic tabs 240 and the second actuator 500, wherein the elastic tabs 240 have protrusions 241 which are designed to engage with corresponding recesses 510 arranged on the second actuator 500. The protrusions 241 are designed in the form of axis-parallel cones and the corresponding recesses 510 are designed as axial parallel grooves, which are mechanically engaged with each other, wherein the second actuator 500 in combination with the thread 111 of the first actuator 110 is set up to convert a rotational movement of the second actuator 500 into a stroke movement of the transfer element 200 along the displacement axis X, wherein the transfer element 200 is further screwed onto, or is unscrewed from, the first actuator 110 which is non-displaceable relative to the transfer element 200, thereby achieving a stroke movement of the transfer element 200.

To limit the rotational movement or the stroke movement of the transfer element 200, the adjusting device 10 further has a blocking element 600, which in combination with a stop 250 arranged on the outside of the transfer element 200 is set up to limit a rotational movement of the transfer element 200 about the displacement axis X, wherein the blocking element 600 and the stop 250 of the transfer element 200 are shown more clearly in FIG. 1B.

FIG. 3 shows an exemplary motor vehicle headlight 30 with a housing 31, in which the previously described adjusting device 10 is arranged, wherein the displacement axis X is arranged vertically in the motor vehicle headlight 30. Furthermore, it is clearly shown that the adjusting device 10 comprises a carrying frame 400, which is firmly connected to the supporting bushing 300 (not shown in FIG. 3) and is arranged horizontally or perpendicular to the displacement axis X.

It should be noted that terms such as "vertical", "horizontal", "top" and "bottom" are to be understood in the context of a properly installed motor vehicle headlight.

An optically relevant assembly 20 is arranged on the carrying frame 400, as can be seen in FIG. 4. It should be noted that multiple optical assemblies can be arranged on the carrying frame 400.

The optically relevant assembly 20 can on the one hand be displaced along the displacement axis X, or oriented differently, by initiating a rotational movement of the second actuator 500, as described above, and on the other hand via a linear movement of the first actuator 110 by means of the actuating motor 100. As shown in FIG. 5, the drive device 100 herein is firmly connected to the housing 31 (not shown here) of the motor vehicle headlight 30 by means of a mounting element 32.

For example, the exemplary adjusting device 100 can be provided for controlling a light range, wherein, for example, the carrying frame 400 can additionally be connected to the housing 31 of the motor vehicle headlight 30 in one location for this purpose. To achieve this, the supporting portion 230 of the transfer element 200 is designed as a symmetrical spherical layer, wherein FIG. 6 is a detailed view of the supporting bushing 300 and the supporting portion 230 of the transfer element 200, which is rotatably supported in the supporting bushing 300. In FIG. 6, the supporting portion 230—as mentioned above—is formed as a symmetrical spherical layer, wherein the supporting bushing 300 has an opening corresponding to the symmetrical spherical layer. In this manner, the supporting bushing 300 can be tilted about a horizontal plane, which also makes it possible to tilt the carrying frame 400, if the same is fixed at a location of the housing 31 of the motor vehicle headlight 30.

LIST OF REFERENCE NUMBERS

Adjusting device . . . 10
Optically relevant assembly . . . 20
Motor vehicle headlight . . . 30
Housing . . . 31
Mounting element . . . 32
Drive device . . . 100
First actuator . . . 110
Thread . . . 111
Transfer element . . . 200
Counter thread . . . 211
Second opening . . . 220
Supporting portion . . . 230
Elastic tabs . . . 240
Protrusions . . . 241
Stop . . . 250
Supporting bushing . . . 300
Carrying frame . . . 400
Second actuator . . . 500
Recesses . . . 510
Blocking element . . . 600

The invention claimed is:

1. An adjusting device (10) for adjusting at least one optically relevant assembly (20) of a motor vehicle headlight, the adjusting device (10) comprising:
a drive device (100) with a first actuator (110) which is linearly adjustable along a displacement axis (X), is arranged such that it is unable to rotate, and has a first engaging portion (111);
a transfer element (200) which is mechanically engaged with the first actuator (110), wherein the transfer element (200) has a first counter engaging portion (210) corresponding to the first engaging portion (111) of the first actuator (110);
a supporting bushing (300) in which the transfer element (200) is supported by a supporting portion (230) of the transfer element (200) such that it can rotate about the displacement axis (X), wherein the supporting bushing (300) is firmly connected to a carrying frame (400), wherein the at least one optically relevant assembly (20) is arranged on the carrying frame (400); and
a second actuator (500) which is supported such that it is rotatable about the displacement axis (X) and which has a second engaging portion (510), wherein the transfer element (200) has a second counter engaging portion (220), which second counter engaging portion (220) is arranged opposite to the first counter engaging portion (210) of the transfer element (200) on the displacement axis (X), and wherein the second counter engaging portion (220) is mechanically engaged with the second engaging portion (510), and wherein the second actuator (500), in combination with the first engaging portion (111) of the first actuator (110), is configured to convert a rotational movement of the second actuator (500) into a stroke movement of the transfer element (200) along the displacement axis (X).

2. The adjusting device according to claim 1, wherein the first engaging portion of the first actuator (110) is designed as a thread (111) and the first counter engaging portion of the transfer element (200) is designed as a first opening (210) with a counter thread (211) corresponding to the thread (111), wherein the transfer element (200) is at least partially screwed onto the first actuator (110) by means of the counter thread (211).

3. The adjusting device according to claim 1, wherein the second counter engaging portion of the transfer element (200) is designed as a second opening (220), wherein the second actuator (500) is supported displaceably along the displacement axis (X) in the second opening (220) of the transfer element (200).

4. The adjusting device according to claim 3, wherein the second actuator (500) is at least partially accommodated in the essentially circular second opening (220) of the transfer element (200), which second opening (220) is arranged concentrically to the displacement axis (X), wherein the transfer element (200) has elastic tabs (240) to protect against overtightening, which tabs (240) are arranged on the circumference of the second opening (220) and extend along the displacement axis (X), wherein the elastic tabs (240) have protrusions (241) which are set up to engage with corresponding recesses (510) arranged on the second actuator (500).

5. The adjusting device according to claim 4, wherein the protrusions (241) are designed in the form of axis-parallel cones and the corresponding recesses (510) are designed as axis-parallel grooves.

6. The adjusting device according to claim 1, wherein the drive device (100) is designed as a linear actuating motor.

7. The adjusting device according to claim 1, wherein the drive device (100) is arranged non-displaceably relative to the carrying frame (400).

8. The adjusting device according to claim 1, wherein the adjusting device (10) comprises a blocking element (600) which is arranged in combination with a stop (250) arranged on the outside of the transfer element (200), such that a rotational movement of the transfer element (200) about the displacement axis (X) is limited.

9. The adjusting device according to claim 1, wherein the supporting portion (230) of the transfer element (200) is formed as a symmetrical spherical layer, wherein the supporting bushing (300) has an opening corresponding to the symmetrical spherical layer.

10. The adjusting device according to claim 1, wherein the carrying frame (400) is arranged horizontally.

11. The adjusting device according to claim 1, wherein the displacement axis (X) is arranged vertically and essentially perpendicular to the carrying frame (400).

12. A motor vehicle headlight (30) having a housing (31) and at least one optically relevant assembly (20) and having at least one adjusting device (10) according to claim 1.

13. The motor vehicle headlight according to claim 12, wherein the drive device (100) is firmly connected to the housing (31) of the motor vehicle headlight (30).

* * * * *